US 6,694,070 B2

(12) United States Patent
Gottlieb et al.

(10) Patent No.: US 6,694,070 B2
(45) Date of Patent: Feb. 17, 2004

(54) APPARATUS AND METHOD FOR TRAINING HIGH DENSITY OPTICAL CROSS CONNECTS

(76) Inventors: Albert M. Gottlieb, 60 Midland Blvd., Maplewood, NJ (US) 07040; John P. Hickey, 12 Ticonderoga Ave., Oceanport, NJ (US) 07757

( * ) Notice: Subject to any disclaimer, the term of this patent is extended or adjusted under 35 U.S.C. 154(b) by 328 days.

(21) Appl. No.: 09/880,330

(22) Filed: Jun. 13, 2001

(65) Prior Publication Data

US 2002/0191890 A1 Dec. 19, 2002

(51) Int. Cl.[7] .................................................. G02B 6/42
(52) U.S. Cl. ......................................................... 385/16
(58) Field of Search ............................... 385/40, 16–18, 385/11, 44–45; 359/495, 290, 831, 833, 334, 124

(56) References Cited

U.S. PATENT DOCUMENTS 5,491,548 A * 2/1996 Bell et al. ................... 356/73.1
6,310,716 B1 * 10/2001 Evans et al. ................. 359/334
6,341,032 B1 * 1/2002 Fukashiro et al. ........... 359/337
6,563,973 B1 * 5/2003 Caracci et al. ................. 385/17
2002/0176129 A1 * 11/2002 Dinu et al. ................... 359/110

OTHER PUBLICATIONS

USSN 09/680,753, filed Oct. 06, 2000, entitled: System and Method for Training an Optical Cross–Connect Comprising Steerable Switching Elements.
USSN 60/158,475, filed Oct. 08, 1999, entitled: Method and Apparatus for Training a Micro–Electromechanical System-–Based Steerable Mirror Array.

* cited by examiner

*Primary Examiner*—Jean F. Duverne

(57) ABSTRACT

A method and apparatus for training an optical switch include a splitter for splitting an optical signal into a plurality of reduced power optical signals, the plurality of reduced power optical signals being applied to respective input ports of the optical switch, and a plurality of output power measuring devices for measuring the optical power of the optical signals at each of a plurality of output ports of the optical switch. The method and apparatus further include a controller, for adapting operational parameters within respective communications paths of the optical switch in a manner tending to reduce the optical attenuation imparted to switched optical signals within each communications path, the optical attenuation being determined using the input and output power measuring devices.

16 Claims, 4 Drawing Sheets

100

500

APPARATUS AND METHOD FOR TRAINING HIGH DENSITY OPTICAL CROSS CONNECTS

TECHNICAL FIELD

The invention relates to the field of communications systems and, more specifically, to apparatus and methods for "training" an optical switch fabric.

BACKGROUND OF THE INVENTION

The "training" of an optical switch fabric is the process of adapting various parameters within the switch fabric such that the amount of power attenuation imparted to a switched optical signal is minimized. Training an optical switch fabric becomes increasingly time-consuming as the switch fabric density increases. For example, a 256×256 port switch fabric typically comprises 64 K connections, while a 1296×1296 port switch fabric contains approximately 25 times more connections (i.e., 1.6 M connections).

A first method of training a switch fabric comprises using of a single optical input source that is used to sequentially apply an optical signal to each input port of the switch fabric. The switch fabric then sequentially couples the applied optical signal to each of the output ports. A single power monitoring device measures the output power of the optical signal provided at each output port. Various parameters within the switching fabric are adapted until the amount of power measured at the output port is maximized (or at least above a minimum threshold level). Advantageously, the use of a single power monitoring device such as a standard power meter allows for a level of sensitivity to power measurement fluctuations of approximately −80 to −90 dBm range, thereby providing great sensitivity such that parameter adjustments within a switch fabric may be accurately evaluated. Unfortunately, the speed at which an optical switch can be trained using this method depends on the speed with which the shared resources (i.e., the optical input source and the monitoring device) can be switched among the various input and output ports.

A second method of training comprises providing a dedicated optical input source for each of the input ports and a dedicated power monitoring device for each of the individual output ports. This method avoids the speed constraints placed upon the method described above due to the sharing of resources. A practicable system utilizing this technique requires power monitors such as p-i-n diodes, PN diodes or avalanche diodes at every input port and output port. While this technique allows for relatively quick training of the switch fabric, the limited dynamic range of the output port power monitors limits the accuracy of such training. Also, using these types of power monitoring devices, the level of sensitivity to power measurement fluctuations is reduced to approximately −35 dBm. Thus, relatively minor adjustments of switch fabric parameters may not produce enough fluctuation in output power measurement to be detected and, therefore, evaluated properly. In addition, a large amount of hardware is needed to drive and monitor all the ports on the switch to be trained.

SUMMARY OF THE INVENTION

The invention comprises a method and apparatus for training an optical cross-connect or switch fabric using a relatively small number of optical sources and relatively inexpensive power measurement devices. Specifically, energy provided by a single optical source is split into a plurality of reduced-power optical signals, each of the reduced power optical signals being coupled to a respective input port of a switch fabric. A controller causes each input port of the switch fabric to be sequentially coupled to each of a plurality of output ports where a respective power monitoring device is used to determine optical power losses within each optical path within the switch fabric. The controller adapts operational parameters of the switch fabric in a manner tending to reduce optical attenuation imparted to optical signals switched therethrough.

BRIEF DESCRIPTION OF THE DRAWINGS

So that the manner in which the above-recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

The invention will be described within the context of an optical cross-connect or switch fabric utilizing, illustratively, micro-electromechanical systems (MEMS)-based mirror arrays. However, it will be appreciated by those skilled in the art that other optical switching fabrics and cross-connects may benefit from the teachings of the present invention. Moreover, other types of free-space optical cross-connects benefit from the teachings of the present invention.

MEMS steerable elements are used in a variety of applications and find particular use within optical cross-connects. A system and method for training an optical cross-connect comprising steerable switching elements is described in more detail in U.S. patent application Ser. No. 09/680,753 filed Oct. 6, 2000 and incorporated herein by reference in its entirety. Briefly, the disclosed systems and method train one or more steerable switching elements associated with a particular cross-connection by dithering (or re-aligning) the tilt position of the one or more switching elements to increase the optical signal power in the optical signal without disrupting the active cross-connection of that optical signal. Because measurement of optical signal power and control of switching elements is performed as a function of only the particular cross-connected optical signal, the invention requires relatively fewer expensive processing resources. Moreover, for a large capacity optical cross-connect or switch fabric having clusters of steerable switching elements, the individual cross-connections can be independently and simultaneously trained according to the principles of the invention. By comparing the actual optical power loss (e.g., measured input power minus measured output power) with a previously stored value representing the expected optical power loss for a particular cross-connection, small adjustments are then made, as appropriate, to optimize the alignment of the mirrors associated with the cross-connection. For example, in one disclosed embodiment if the difference between the measured and expected optical power loss exceeds a prescribed threshold, then a dithering process is initiated whereby the individual mirrors are "walked through" alternate tilt positions until the measured optical signal power has been optimized or increased.

Figure 1:
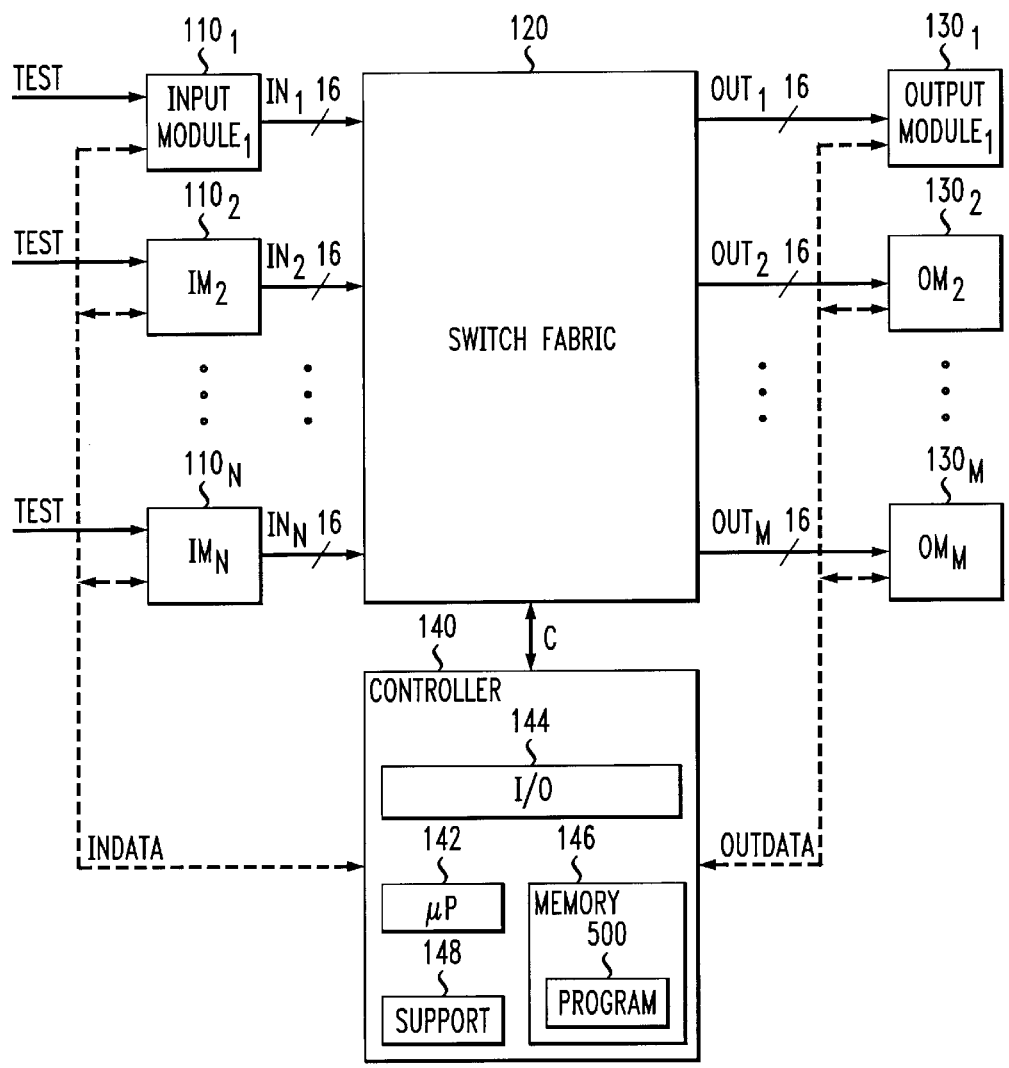
FIG. 1 depicts a high level block diagram of a switching system benefiting from the present invention.

FIG. 1 depicts a high level block diagram of a switch training system benefiting from the present invention. Specifically, the switch training system 100 of FIG. 1 comprises a plurality of input modules $110_1$ through $110_N$ (collectively input modules 110), a switch fabric 120, a plurality of output modules $130_1$ through $130_M$ (collectively output modules 130) and a controller 140. The switching system 100 of FIG. 1 is adapted to train the switch fabric 120 prior to the trained switch fabric being incorporated into a switching product. Optionally, the switching system 100 of FIG. 1 may be incorporated into a switching product and used to periodically adapt the operation of the switch fabric 120.

The switch fabric 120 comprises an optical switch fabric, illustratively a micro-electromechanical systems (MEMS)-based mirror array in which optical signals received via input ports are selectively coupled to output ports via, for example, mirrors or other optical processing means. The switch fabric 120 comprises an N×M switch fabric in which any of N input ports may be optically coupled to any of M output ports to effect thereby the switching of optical signals. The switch fabric 120 establishes various optical communication paths between input and output nodes in response to the control signal C received from the controller 140.

The controller 140 communicates with the input modules 110 via a first communications path denoted as INDATA, and with the output modules 130 via a second communications path denoted as OUTDATA. The controller 140 also communicates with the switch fabric 120 via a third communications path denoted as C. The controller 140 comprises a microprocessor 142, an input/output (I/O) module 144, memory 146 and support circuitry 148. The memory 146 stores various programs, including a programming method 500 described below with respect to FIG. 5. The microprocessor 142 cooperates with conventional support circuitry 148 such as power supplies, clock circuits, cache memory and the like, as well as circuits that assist in executing software routines stored in the memory 146. As such, it is contemplated that some of the process steps discussed herein and software processes may be implemented within hardware, for example, as circuitry that cooperates with the microprocessor 142 to perform various steps. The input-output (I/O) circuitry 144 forms an interface between the various functional elements communicating with the controller 140. For example, in the embodiment of FIG. 1, the controller 140 communicates with the input modules 110, switch fabric 120 and output modules 130.

Although the controller 140 of FIG. 1 is depicted as a general purpose computer that is programmed to perform various functions in accordance with the present invention, the invention can be implemented in hardware as, for example, an application specific integrated circuit (ASIC). As such, the process steps described herein are intended to be broadly interpreted as being equivalently performed by software, hardware, or a combination of hardware and software.

The controller 140 implements a switch training method such as described above with respect to U.S. patent application Ser. No. 09/680,753. That is, the controller 140 communicates with the input modules 110, switch fabric 120 and output modules 130 to cause the selective passing of various optical signals through the switch fabric and the measurement of input and output power levels of the optical signals. The controller 140 adapts various parameters, such as mirror tilt positions within a MEMS switch fabric, to optimize or reduce the amount of signal power loss within the switch fabric 120.

In a preferred embodiment, a control loop is established whereby the controller causes various parameters within the switch fabric 120 to be adjusted (e.g., via adjusting voltage levels used to control parameters such as beam-steering mirrors or other devices). The efficacy of each adjustment is determined with respect to the measured output power. That is, given an adjustment in a switch fabric parameter, an increase in output power indicates that the adjustment is appropriate, whereas a decrease in output power indicates that the adjustment is inappropriate. Optionally, parameter settings within the switch fabric 120 are communicated to the controller 140, and parameter adjustment commands are received from the controller 140 via the communication path C. Parameters may also be adjusted/updated using digital techniques such as updating parameter registers within the switch fabric used to control various operations.

Each input module 110 receives a respective test signal TEST. The test signal TEST comprises an optical signal which is processed by the input module 110 to produce a respective plurality (e.g., N) of signals IN for subsequent routing via the switch fabric 120 to a selective output module 130. An exemplary input module 110 will be described in more detail below with respect to FIG. 2. While each of the input modules 110 of FIG. 1 are depicted as providing 16 signals (i.e., N=16) to the switch fabric 120, it will be appreciated by those skilled in the art that more or less than 16 signals may be provided by each input module 110. Moreover, it will be appreciated that the various input modules may supply differing numbers of signals to the switch fabric 120. In fact, a single input module may be used to supply each input.

Each output module $130_1$ through $130_M$ receives from the switch fabric 120 a respective plurality of output signals denoted as $OUT_1$ through $OUT_{16}$. Each output module 130 measures each of its respective received signals to determine the power level of each signal. An exemplary output module 130 will be described in more detail below with respect to FIG. 3.

For each optical signal path created by the controller 140 via the switch fabric 120, the output power level of an optical signal passed through or communicated via a switch path within the switch fabric 120 is compared to the input power level of the optical signal to determine the amount of power loss or attenuation attributable to the switch fabric 120. Thus, assuming a switch fabric having a specified maximum attenuation of −9 dB, any determined attenuation less than −9 dB is deemed acceptable. By contrast, any determined attenuation greater than −9 dB requires various parameters with the switch fabric 120 to be modified such that the power loss due to attenuation is reduced.

Figure 2:
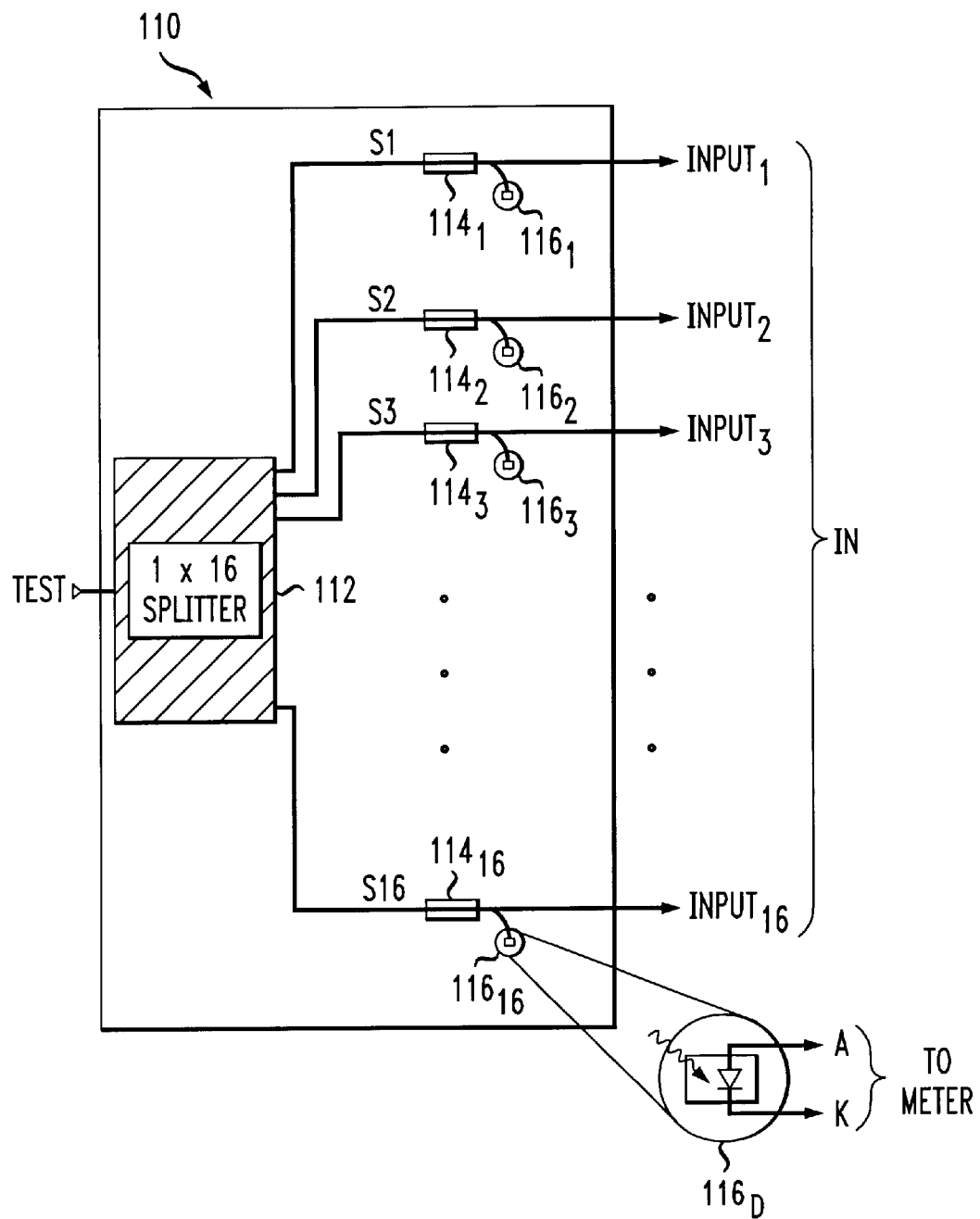
FIG. 2 depicts a high level block diagram of an input module suitable for use in the switching system of FIG. 1.

FIG. 2 depicts a high level block diagram of an input module suitable for use in the switching system of FIG. 1.

Specifically, the input module 110 of FIG. 2 comprises a splitter 112 (i.e., a one to N splitter), a plurality of power taps $114_1$ through $114_{16}$ (collectively power taps 114) and a plurality of power monitoring devices $116_1$ through $116_{16}$ (collectively power monitoring devices 116).

The splitter 112 illustratively comprises a one to sixteen (1×16) splitter (i.e., N=16). The 1×16 splitter 112 receives an optical test signal TEST and responsively splits the optical test signal TEST into 16 reduced power optical signals, denoted as S1 through S16. Each of the reduced power optical signals S1 through S16 provided by the splitter 112 is coupled to a respective tap $114_1$ through $114_{16}$. Each of the power taps $114_1$ through $114_{16}$ diverts a portion of the respective reduced power optical signals S1 through S16 to a respective power monitoring device $116_1$ through $116_{16}$. In the exemplary embodiment of FIG. 2, each of the taps 114 comprises a 4% tap.

It will be known to those skilled in the art that other types of power taps may be advantageously utilized within the context of the present invention. The non-diverted portion of the optical signal produced at the output of a tap 114 is coupled to a respective input port of the switch fabric 120 as signals $INPUT_1$ through $INPUT_{16}$.

Each power measuring device 116 comprises, illustratively, a p-i-n diode, such as shown in FIG. 2 as power measurement device $116_D$. The p-i-n device $116_D$ receives a respective diverted optical signal which responsively produces an excitation that is transmitted to a metering circuit (not shown) via anode A and cathode K signal paths. The metering circuit may comprise, for example, an analog to digital (A/D) converter that responsibly produces a digital output word suitable for processing by the controller 140.

The power measuring devices $116_1$ through $116_{16}$ serve to monitor the power levels of the reduced power optical signals S1 through S16. A control signal path denoted as INDATA operatively couples each input power module 110 to the controller 140. In response to control signals received via the in-data signal path, the input modules 110 responsively provide data indicative of the power level of power reduced optical signals provided to the switched fabric 120.

Advantageously, the input module 110 of FIG. 2 utilizes the output of a single optical source (not shown) to produce the optical test signal TEST. In this manner, the multiplicity of cost inherent in applying individual optical test signals derived from respective individual optical sources to each of the switch fabric input ports is avoided.

Figure 3:
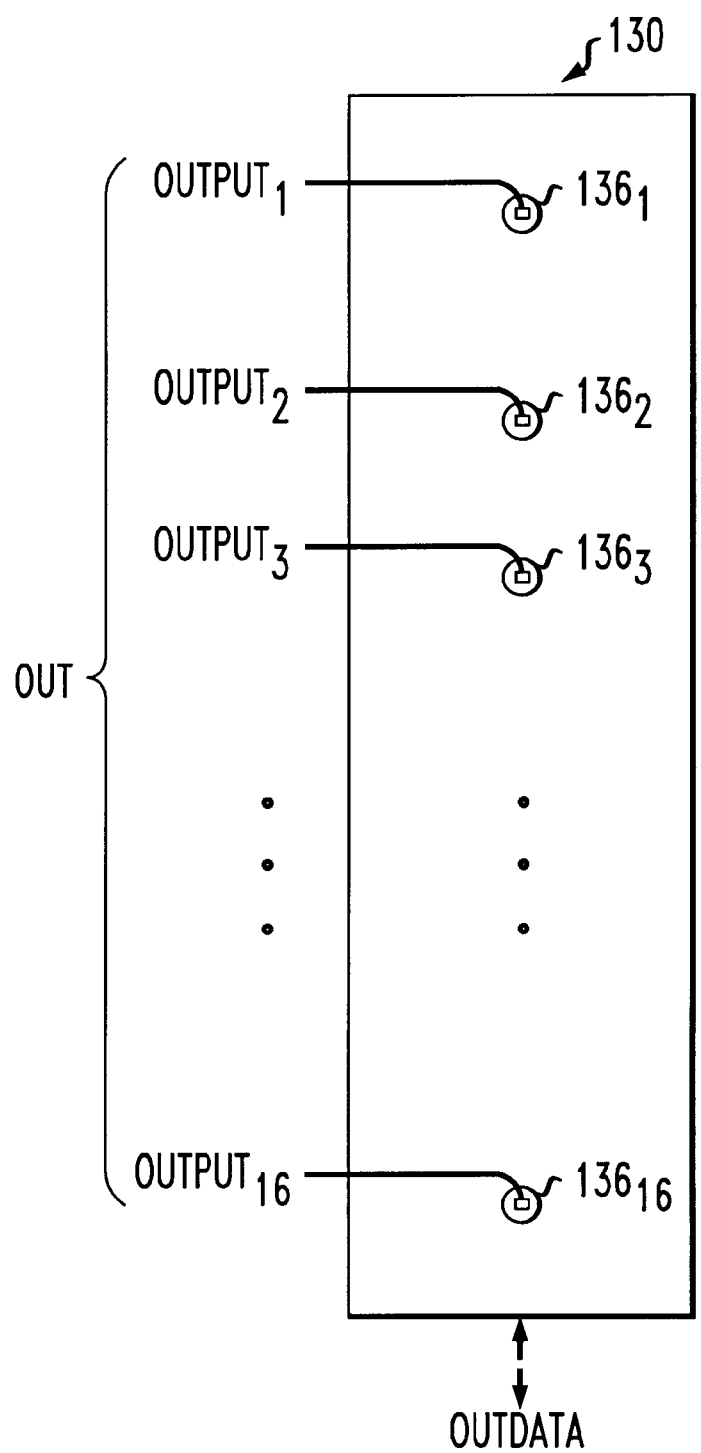
FIG. 3 depicts a high level block diagram of an output module suitable for use in the switching system of FIG. 1.

FIG. 3 depicts a high level block diagram of an output module suitable for use in the switching system of FIG. 1. Specifically, the output module 130 comprises a plurality of power monitoring devices $136_1$ through $136_{16}$ (collectively power monitoring devices 136). Power monitoring devices 136 operate in substantially the same manner as previously described with respect to power monitoring devices 116 within the input modules 110. Each of the power monitoring devices $136_1$ through $136_{16}$ receives a respective non-diverted, tapped, reduced power optical signal $OUTPUT_1$ through $OUTPUT_{16}$ via the switch fabric 120. Importantly, the output module 130 does not utilize power taps to divert portions of received optical signals to the power monitoring devices 136. Thus, the power monitoring devices 136 operate on the entire optical signal passed through the switch fabric 120. By avoiding the use of power taps an additional 10 dB of dynamic range is provided, which allows for more precise measurement of the output signals received from the switch fabric 120. Thus, relatively inexpensive power measuring devices may be utilized while maintaining a high degree of correlation between output power measurements and increases and/or decreases in switch fabric loss due to parameter adjustment.

The power measuring devices $136_1$ through $136_{16}$ serve to monitor the power level of received optical signals. A control signal path denoted as OUTDATA operatively couples each output power module 130 to the controller 140. The output modules 130 provides data indicative of the power level of reduced-power optical signals received via the switch fabric 120. It is noted that the received optical signals have a power level that has been initially reduced due to the operation of splitter 112 within the input module 110, and further reduced due to losses within the switched fabric 120 and the power taps 114 within the input module 110. Advantageously, by avoiding the use of taps in the output module 130, a greater measurement sensitivity of 10 db is gained.

Figure 4:
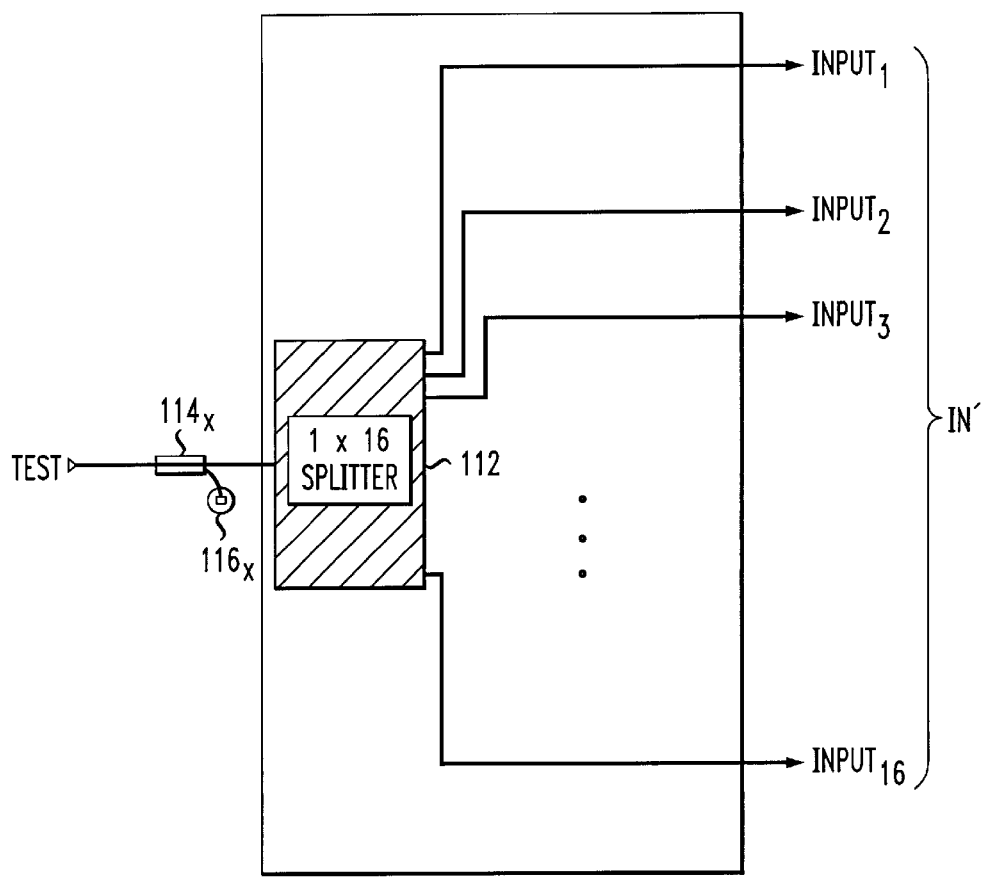
FIG. 4 depicts a high level block diagram of an alternate embodiment of the input module of FIG. 2.

FIG. 4 depicts a high-level block diagram of an alternate embodiment of the input module of FIG. 2. The input module 110 of FIG. 4 operates in the manner similar to that described above with respect to the input module 110 of FIG. 2. The main difference is that the input module 110 of FIG. 4 uses a common tap $114_X$ for diverting a portion of the input signal TEST prior to the splitter 112 and a single power monitoring device $116_X$ to measure the power of the optical test signal TEST. That is, in the input module 110 of FIG. 4, a power tap $114_X$, illustratively a 4% power tap, diverts a portion of the optical test signal TEST to a power monitoring device $116_X$. The non-diverted portion of the input test signal TEST is provided to the 1×16 splitter 112. The reduced power optical signals S1 through S16 provided by the splitter 112 are coupled directly to the switch fabric 120 via signal paths $INPUT_1$ through $INPUT_{16}$.

In the embodiment of FIG. 4, the single power measuring device $116_X$ measures the total or aggregate power of each of the reduced power optical signals applied to respective input ports of the switch fabric 120. In this embodiment, the controller 140 may operate in the above-described manner to adapt switch fabric parameters such that loss is minimized within each optical communication path in the switch fabric.

Figure 5:
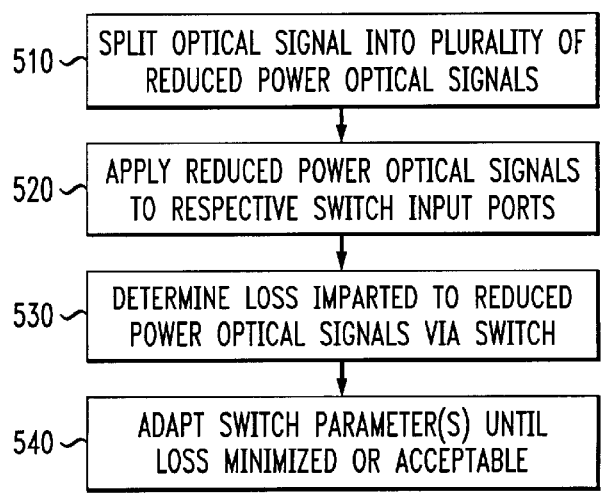
FIG. 5 depicts a flow diagram of a training method suitable for use in the switching system of FIG. 1.

FIG. 5 depicts a flow diagram of a training method suitable for use in the switching system of FIG. 1. The method 500 of FIG. 5 may be stored within the memory 146 of the controller 140 of FIG. 1 as program 500.

The method 500 is entered at step 510, where an optical test signal is split into a plurality of reduced power optical signals. At step 520, the reduced power optical signals are applied to respective input ports of the switch fabric 120. At step 530, the loss imparted to each of the reduced power optical signals via the switch fabric is determined. That is, at step 530 the output power of each optical signal received at an output module is compared to the input power of that optical signal as provided to the switch fabric to determine the amount of power attention caused by the switch fabric. At step 540, the switch parameter(s) of the switch fabric are adapted as necessary until the loss or attenuation is minimized or acceptable. For example, in the case of a MEMS switch fabric having a maximum allowable loss of 9 dB, mirror positions for each possible optical path within the switch fabric are adjusted until that optical path has an optical attenuation of no more than −9 dB.

In one embodiment, the optical test signal TEST and the 1×N splitter 112 of the input module 110 are sufficiently precise to provide a plurality of reduced power optical signals having known power levels. In this embodiment, the power taps $114_1$, $114_{16}$ as well as the power measuring devices $116_1$ through $116_{16}$ are not used. Rather, the single power tap $114_x$ and single power measuring device $116_x$ is used. Thus, the aggregate power provided to the splitter 112 is determined rather than the power level of each reduced power optical signal provided by the splitter 112. In this embodiment, the tap 114 and power measuring devices 116 are not used. The power loss within each switched optical path of the switch fabric 120 is determined with respect to the measured output power and the known input power of the reduced power optical signals.

In one embodiment, a single input module 110 comprises a 1×N splitter 112 which is used to provide a reduced power optical signal to each input port of a switch fabric 120. In a further modification, any of the above embodiments may utilize a plurality of output modules 130 or a single output module 130 to measure the power level of signals provided at output ports of the switch fabric 120.

Although various embodiments which incorporate the teachings of the present invention have been shown and described in detail herein, those skilled in the art can readily devise many other varied embodiments that still incorporate these teachings.

What is claimed is:

1. A method of training an optical switch, comprising:

splitting an optical signal into a plurality of reduced power optical signals;

applying each of said plurality of reduced power optical signals to a respective input port of said optical switch;

causing said optical switch to selectively provide communications paths between said input ports and a plurality of output ports;

measuring the optical power at each of the plurality of output ports of said optical switch; and causing operational parameters within respective communications paths of said optical switch to be adapted in a manner tending to reduce optical attenuation within each of said provided communications paths.

2. The method of claim 1, wherein said optical attenuation is determined with respect to the measured optical power at said plurality of output ports and a measured optical power of said reduced power optical signals.

3. The method of claim 2, wherein said reduced power optical signals are individually measured by diverting a portion of each reduced power optical signal to a power measuring device.

4. The method of claim 2, wherein said reduced power optical signals are measured by diverting a portion of said optical signal to a measuring device.

5. The method of claim 1, wherein the measured optical power at each of the plurality of optical ports comprises the entire optical power communicated to each respective output port.

6. The method of claim 1, each adaptation of an optical parameter of said optical switch causing a change in measured optical power at an output port is accepted or rejected based upon a respected increase or decrease in measured optical power at said output port.

7. The method of claim 1, wherein:

said step of splitting comprises the step of splitting a plurality of optical signals into respective pluralities of reduced power optical signals.

8. Apparatus for training an optical switch, comprising:

a splitter, for splitting an optical signal into a plurality of reduced power optical signals, each of said plurality of reduced power optical signals being coupled to a respective input port of said optical switch;

at least one input power measuring device for measuring optical power provided to the optical switch;

a plurality of output power measuring devices for measuring optical power at the optical switch output ports;

a controller, for adapting operational parameters within respective communications paths of said optical switch in a manner tending to reduce the optical attenuation imparted to switched optical signals within each communications path, said optical attenuation being determined using said input and output power measuring devices.

9. The apparatus of claim 8, wherein said at least one input power measuring device comprises a plurality of power measuring devices, each of said plurality of power measuring devices measuring a respective reduced power optical signal.

10. The apparatus of claim 9, further comprising:

a plurality of power taps, each power tap diverting a portion of a respective reduced power optical signal to a respective power measuring device.

11. The apparatus of claim 8, further comprising at least one additional splitter, for splitting at least one additional optical signal into at least one additional plurality of reduced power optical signals, each reduced power optical signal within said at least one additional plurality of reduced power optical signals being coupled to a respective input port of said optical switch.

12. The apparatus of claim 11, wherein said at least one input power measuring device comprises a plurality of power measuring devices, each of said plurality of power measuring devices coupled to a respective reduced power optical signal.

13. The apparatus of claim 11, further comprising:

a plurality of power taps, each power tap diverting a portion of a respective reduced power optical signal to a respective power measuring device.

14. The apparatus of claim 8, wherein said input and output power measuring devices comprise at least one of a p-i-n diode, a PN diode or an avalanche diode.

15. The apparatus of claim 8, wherein said optical switch comprises a micro-electromechanical system (MEMS)-based mirror array, said adapted operational parameters comprising at least a mirror adjustment parameter.

16. A computer readable medium having computer executable instructions for performing steps comprising:

splitting an optical signal into a plurality of reduced power optical signals;

applying each of said plurality of reduced power optical signals to a respective input port of said optical switch;

causing said optical switch to selectively provide communications paths between said input ports and a plurality of said output ports;

measuring the optical power at each of the plurality of output ports of said optical switch; and causing operational parameters within respective communications paths of said optical switch to be adapted in a manner tending to reduce optical attenuation within each of said provided communications paths.

* * * * *

UNITED STATES PATENT AND TRADEMARK OFFICE
CERTIFICATE OF CORRECTION

PATENT NO.    : 6,694,070 B2
DATED         : February 17, 2004
INVENTOR(S)   : Albert M. Gottlieb and John P. Hickey It is certified that error appears in the above-identified patent and that said Letters Patent is hereby corrected as shown below:

<u>Title page,</u>
Insert:
-- [73] Assignee: Lucent Technologies Inc., Murray Hill, N.J. --

Signed and Sealed this

Third Day of August, 2004

JON W. DUDAS
*Acting Director of the United States Patent and Trademark Office*